(12) United States Patent
Shu et al.

(10) Patent No.: US 8,861,150 B2
(45) Date of Patent: Oct. 14, 2014

(54) BATTERY SYSTEM

(75) Inventors: Ying-How Shu, Taipei (TW); Feng-Yuan Wang, Taipei (TW)

(73) Assignee: All New Energy Technology Corp., Taipei (TW)

( * ) Notice: Subject to any disclaimer, the term of this patent is extended or adjusted under 35 U.S.C. 154(b) by 539 days.

(21) Appl. No.: 13/299,354

(22) Filed: Nov. 17, 2011

(65) Prior Publication Data
US 2012/0062034 A1      Mar. 15, 2012

Related U.S. Application Data

(63) Continuation-in-part of application No. 12/201,346, filed on Aug. 29, 2008, now abandoned.

(51) Int. Cl.
| | |
|---|---|
| *H02H 7/18* | (2006.01) |
| *H02H 9/00* | (2006.01) |
| *H02J 7/00* | (2006.01) |
| *B60L 11/18* | (2006.01) |
| *B60L 3/00* | (2006.01) |

(52) U.S. Cl.
CPC ............ *H02J 7/0026* (2013.01); *Y02T 10/7005* (2013.01); *B60L 11/1861* (2013.01); *B60L 11/1866* (2013.01); *Y02T 10/7061* (2013.01); *B60L 2240/547* (2013.01); *Y02T 10/7044* (2013.01); *B60L 3/0046* (2013.01); *Y02T 10/7055* (2013.01)
USPC .............................. 361/56; 307/10.7; 307/71

(58) Field of Classification Search
CPC .................................. H02H 7/18; H02H 9/00
USPC ....................................... 307/10.7, 71; 361/56
See application file for complete search history.

(56) References Cited

U.S. PATENT DOCUMENTS 8,330,418 B2 *   12/2012   Furukawa ..................... 320/118

\* cited by examiner

*Primary Examiner* — Hal Kaplan
(74) *Attorney, Agent, or Firm* — Chun-Ming Shih

(57) ABSTRACT

A battery system includes batteries; a voltage detector linking batteries and detecting batteries' voltage; an equalizer linking batteries and fine-tuning their charging/discharging efficiency; a battery protection board on which there is a MCU used to receive signals from the voltage detector for characteristic differences between batteries balanced by the equalizer and batteries with similar charging and discharging efficiency; a digital interface connected between the MCU and an upper-level control system as one interface of signal transmission.

10 Claims, 6 Drawing Sheets though digital interfaces for battery management exist, most rely on One-Wire Bus, Maxim/HDQ Bus, TI/Smart Management Bus, Intel/CAN-Bus, or Controller Area Network. While these avoid master-slave configuration issues, they do not account for potential voltage differences. Therefore, digital signals transmitted in those interfaces must share the same voltage level or undergo sequential voltage-level shifting. Considering modular design flexibility, a new digital interface free from potential-voltage issues is needed, one that allows battery modules' power cables to be connected in series or parallel as required.

BATTERY SYSTEM

CROSS REFERENCES RELATED TO THE APPLICATION

This application is a continuation-in-part of U.S. patent application Ser. No. 12/201,346 filed on Aug. 29, 2008 now abandoned.

BACKGROUND OF THE INVENTION

1. Field of the Invention

The present invention relates to a battery system, especially a battery system which allows either batteries with same specifications in series for batteries' status easily monitored or series-parallel batteries for any battery freely replaced during maintenance and significantly reduced cost in design or maintenance.

2. Description of the Prior Art

The digital interface frequently observed in batteries of a common electric car is used to control charge/discharge of the electric car's power system and to monitor batteries' residual capacity and working status. During development of an electric vehicle's power system, the series-parallel batteries have become a consequential tendency on the basis of a battery's gradually increased capacity or power and consideration of the best capacity-combination. And the replacement and maintenance of the batteries for a digital monitoring system must be taken into account. In the previous patents for digital interfaces with respect to battery management, most digital integrated interfaces are categorized to the One-Wire Bus, Maxim/HDQ Bus, Ti/the Smart Management Bus, Intel/CAN-Bus, Controller Area Network. Those kinds of communication interface are free from master-slave configuration issues, but there is no consideration of potential voltage. Therefore, the digital signal transmitted in those digital interface shall be with the same voltage-level, or sequentially voltage-level shifting. As consideration the flexibility of modular design, we need a new digital interface free from the potential-voltage problem and allowing the power cable of the battery modules connected in serial or parallel as power system needed.

SUMMARY OF THE INVENTION

In view of problems in the prior arts, the object of the present invention is to provide a battery system featuring neither propagation delay & delay-induced collision in multiple series-parallel battery systems nor different voltage levels between interfaces of several used battery units, which result in a high voltage sustained by a Micro Control Unit, with more and more higher-voltage batteries added.

The present invention is based on the object hereinabove to design a battery system. The battery system comprises batteries, a voltage detector (voltage-reading element) which links batteries and detects battery-cell voltages, an equalizer which links batteries and used to fine-tune batteries' charging and discharging efficiency, and a battery protection board. There is a Micro Control Unit (MCU) built-in this battery system, and which is used to receive signals from a voltage detector, to balance characteristic differences between batteries, and to keep batteries with similar charging and discharging efficiency. Furthermore a digital interface connects between the MCU and an upper-level control system for signal communication.

The battery system of the present invention delivers a serial and parallel connection of multiple battery systems via a digital interface.

The battery system of the present invention has a digital interface (a Universal Asynchronous Receiver/Transmitter) which comprises an Up-Link interface and a Down-Link interface, both of which are made up of a voltage isolator and a logic gate circuit wherein the former can be a Photo-Coupler, a Photo-MOSFET or a Photo-Replay and the latter comprises standard logic gates composed of Bio-Polar Transistors (BJT), Field-Effect Transistors (FET) or Metal-Oxide-Semiconductor Field-Effect Transistors (MOSFET).

The battery system of the present invention further comprises an external adapter which transfers signals from a digital interface to signals for control of a network interface.

The battery system of the present invention has an upper-level control system which comprises a Master MCU receiving signals from a digital interface and passing status of the overall battery system to a master control system (an electric car's control system).

It can be seen from descriptions hereinabove the present invention's battery system has one or multiple advantages as follows:

(1) The battery system developed in a battery monitoring system delivers a direct serial connection of multiple batteries, which have same specifications, to monitor digital signals required by the battery system.

(2) The battery system, which allows a serial and parallel connection of multiple batteries and any battery freely changed during maintenance, substantially reduces costs in battery design and maintenance.

(3) The battery system simplifies complexity of a circuit for multiple series-parallel batteries based on prior arts and effectively shrink the area of a circuit on a digital interface.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
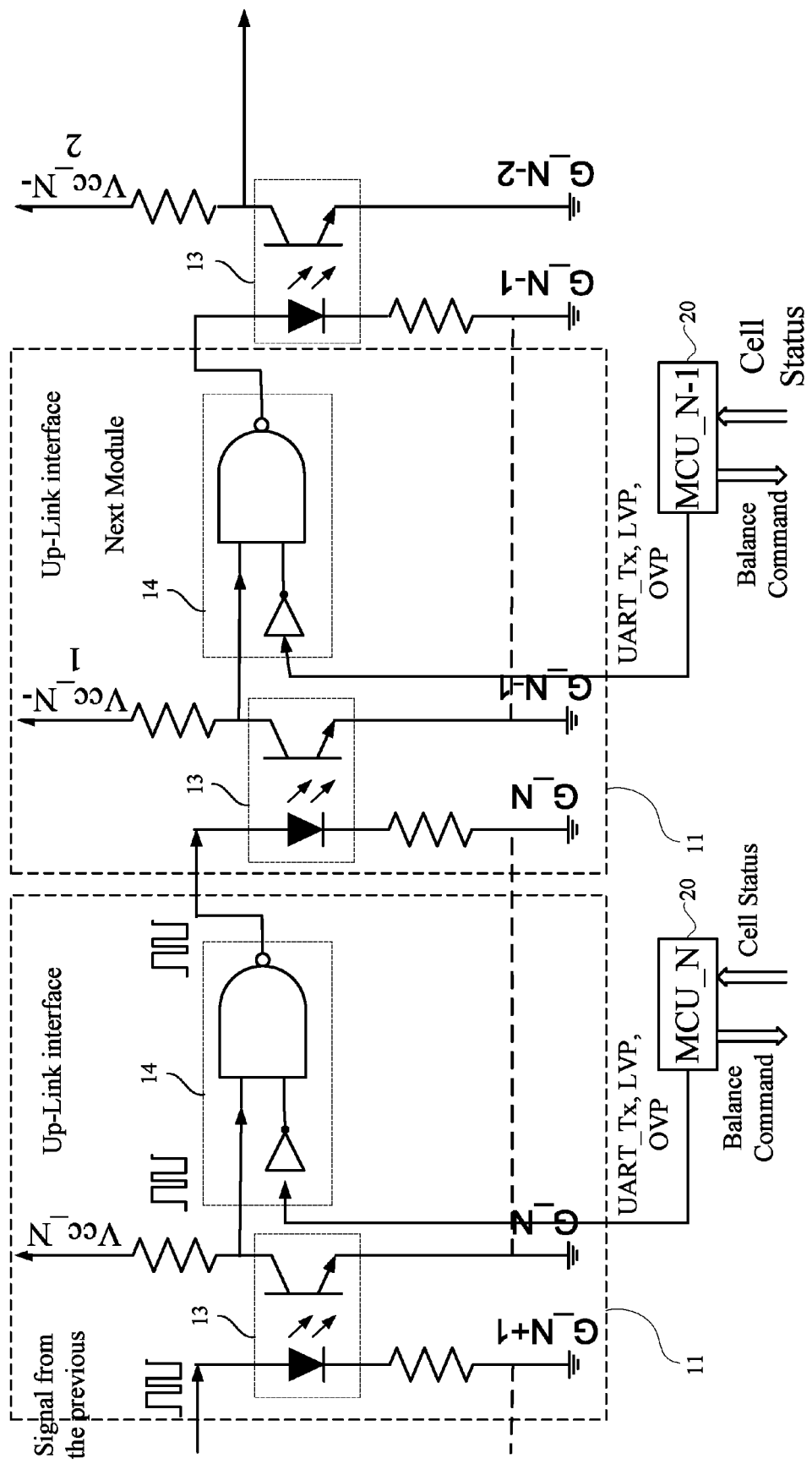
FIG. 1 illustrates the Up-Link interface in the battery system of the present invention.

Referring to FIG. 1 which illustrates an Up-Link interface 11 in a battery system of the present invention wherein a voltage isolator 13 designed in the Up-Link interface 11 is a photo-coupler. Because the voltage level of a Universal Asynchronous Receiver's/Transmitter's signal at the OFF stage is "1", the inverted signal, i.e., a signal with the phase shifted from an actual signal by 180°, is used in the Up-Link interface 11 for effectively reduced power consumption at the OFF stage. For a similar purpose, a photo-MOSFET or a photo-relay could be taken as the voltage isolator 13 in the Up-Link interface 11. In addition to standard logic gates, a logic gate circuit 14 in the Up-Link interface 11 could be a simply logic circuit composed of Bio-Polar Transistors (BJT), Field-Effect Transistors (FET) or Metal-Oxide-Semiconductor Field-Effect Transistors (MOSFET) to effectively simplify the size of a digital interface circuit.

Figure 2:
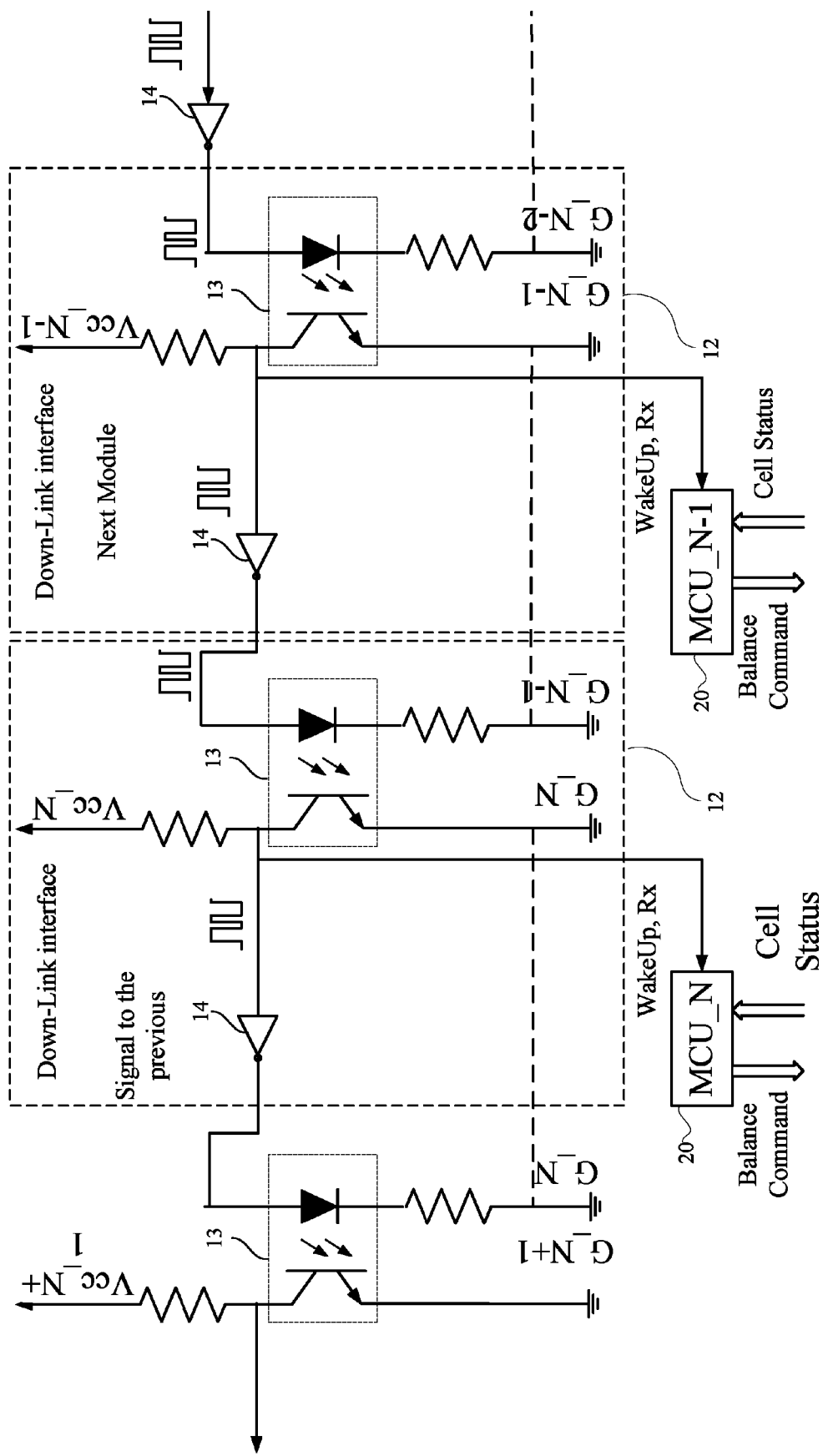
FIG. 2 illustrates the Down-Link interface in the battery system of the present invention.

Referring to FIG. 2 which illustrates the Down-Link interface in a battery system of the present invention. As shown in FIG. 2, the Down-Link interface 12 effective in voltage isolation is one circuit which is almost contrary to the Up-Link interface 11 in FIG. 1 but reasonably corrected in consideration of correctness of signal transmission. In practice, either the Up-Link interfaces or the Down-Link interfaces comprise several units of circuits constructed with voltage isolators 13 and logic gate circuits 14 owing to multiple units of digital signals used in battery management.

Figure 3:
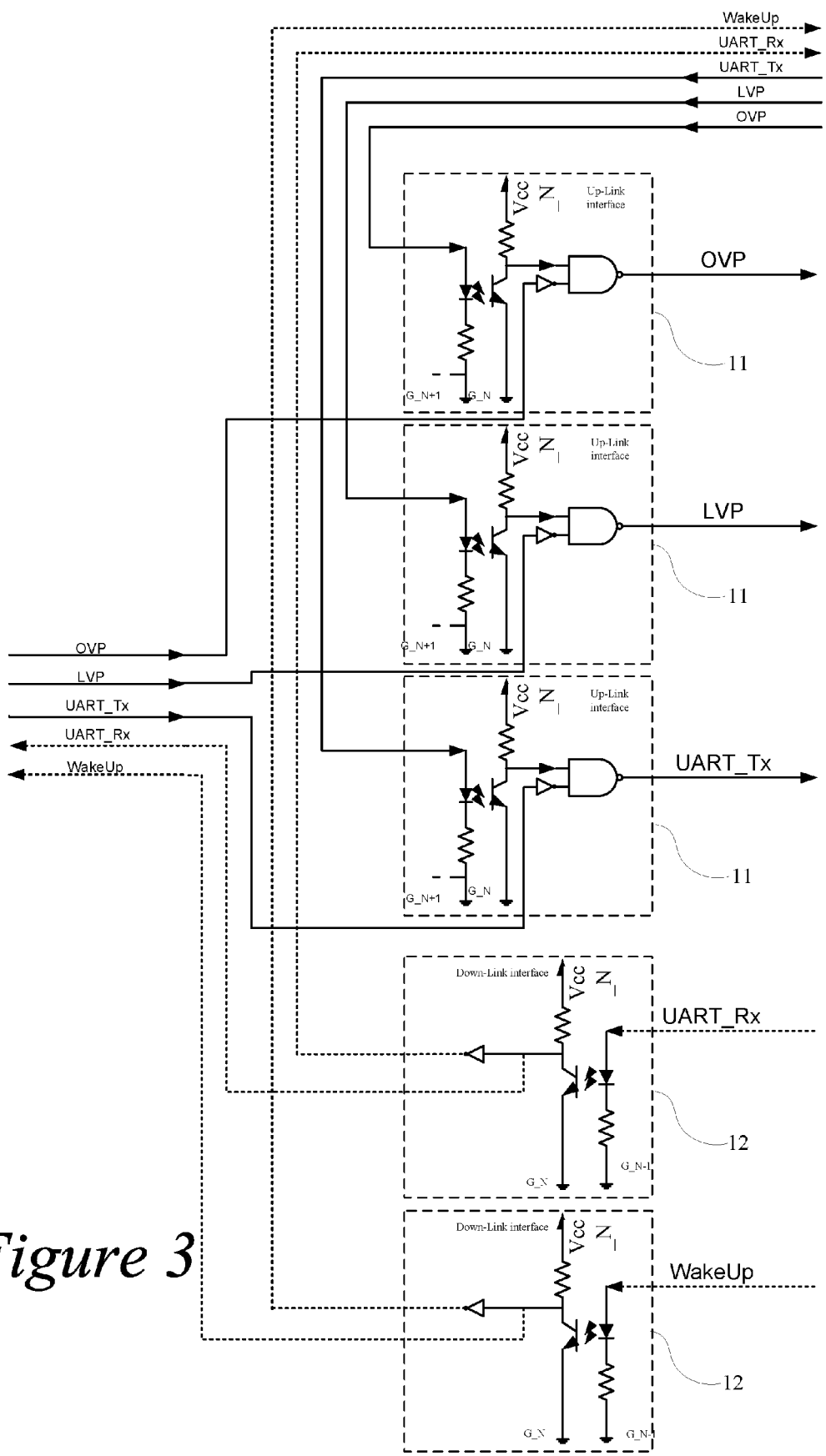
FIG. 3 illustrates both the Up-Link interface and the Down-Link interface in the battery system of the present invention.

Referring to FIG. 3 which illustrates both the Up-Link interface and the Down-Link interface in a battery system of the present invention which have been described in FIGS. 1 and 2.

Figure 4:
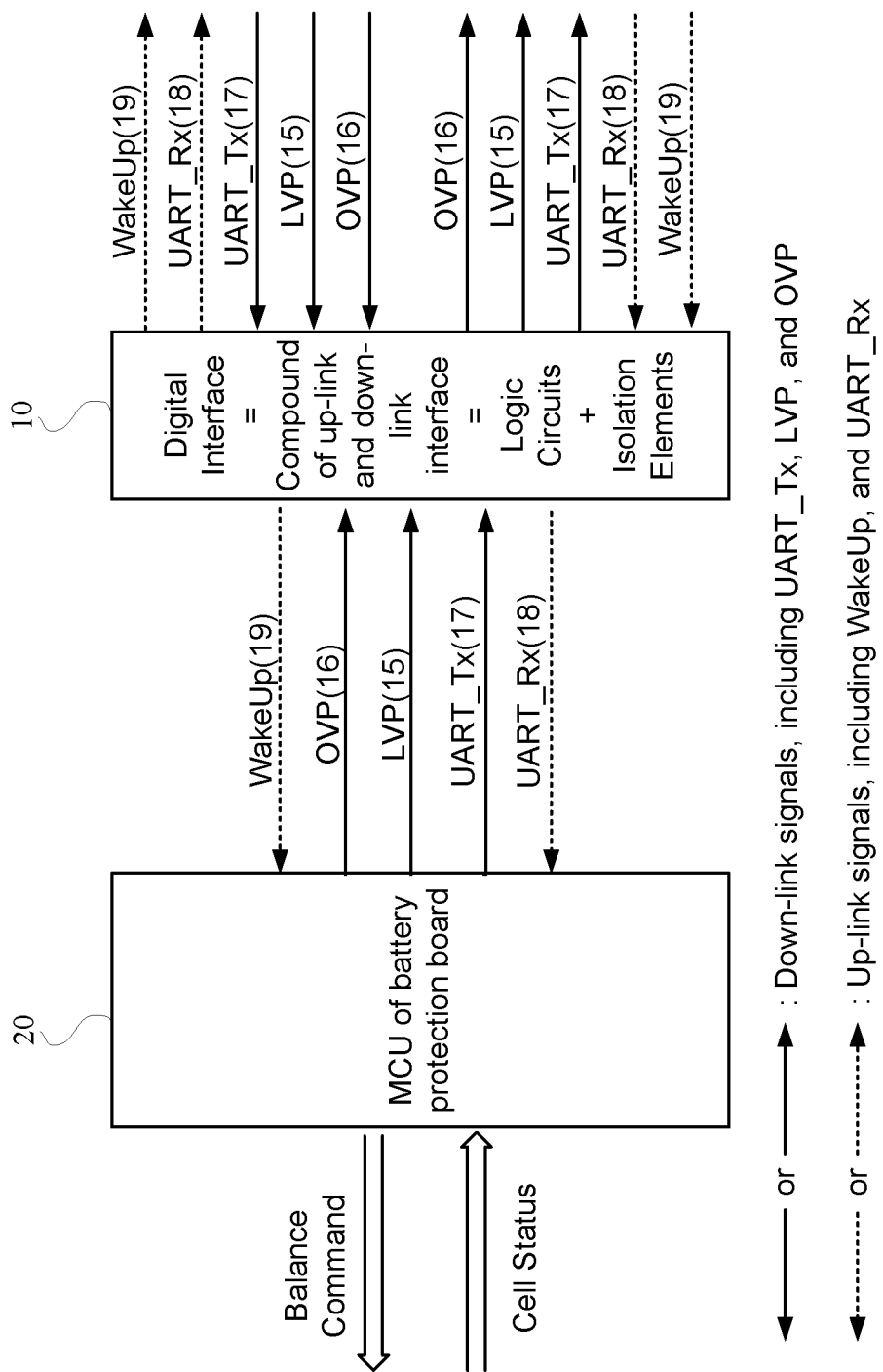
FIG. 4 illustrates signals communicated between a MCU and a digital interface in the battery system of the present invention.

Referring to FIG. 4 which illustrates signals communicated between a MCU and a digital interface in a battery system of the present invention. It can be seen from FIG. 4 there is a Universal Asynchronous Receiver/Transmitter (RS-232) 10 used in the battery system of the present invention and both the Up-Link interface and the Down-Link interface constructed with voltage isolators directly communicate with each battery's digital interface via the following signals: Low Voltage Protection (LVP) signal 15; Over Voltage Protection (OVP) signal 16; Universal Asynchronous Receiver/Transmitter-Transmit Signal (UART_Tx) 17; Universal Asynchronous Receiver/Transmitter-Receive Signal (UART_Rx) 18; Wake-Up signal 19 to wake up the MCU on a battery protection board 20 of a battery unit. In virtue of transmission buffering designed in the Universal Asynchronous Receiver/Transmitter 10, a fault during signal transmission is not induced by the delay time of the voltage isolators 13 serial-connected but eliminated by means of a circuit design with differences in Rising Time and Falling Time or a low Baud Rate considered. In the present invention, the digital interface 10 in which there are voltage isolators 13 installed allows other signal sources with different voltage levels to be imported and added to current signals for export.

Figure 5:
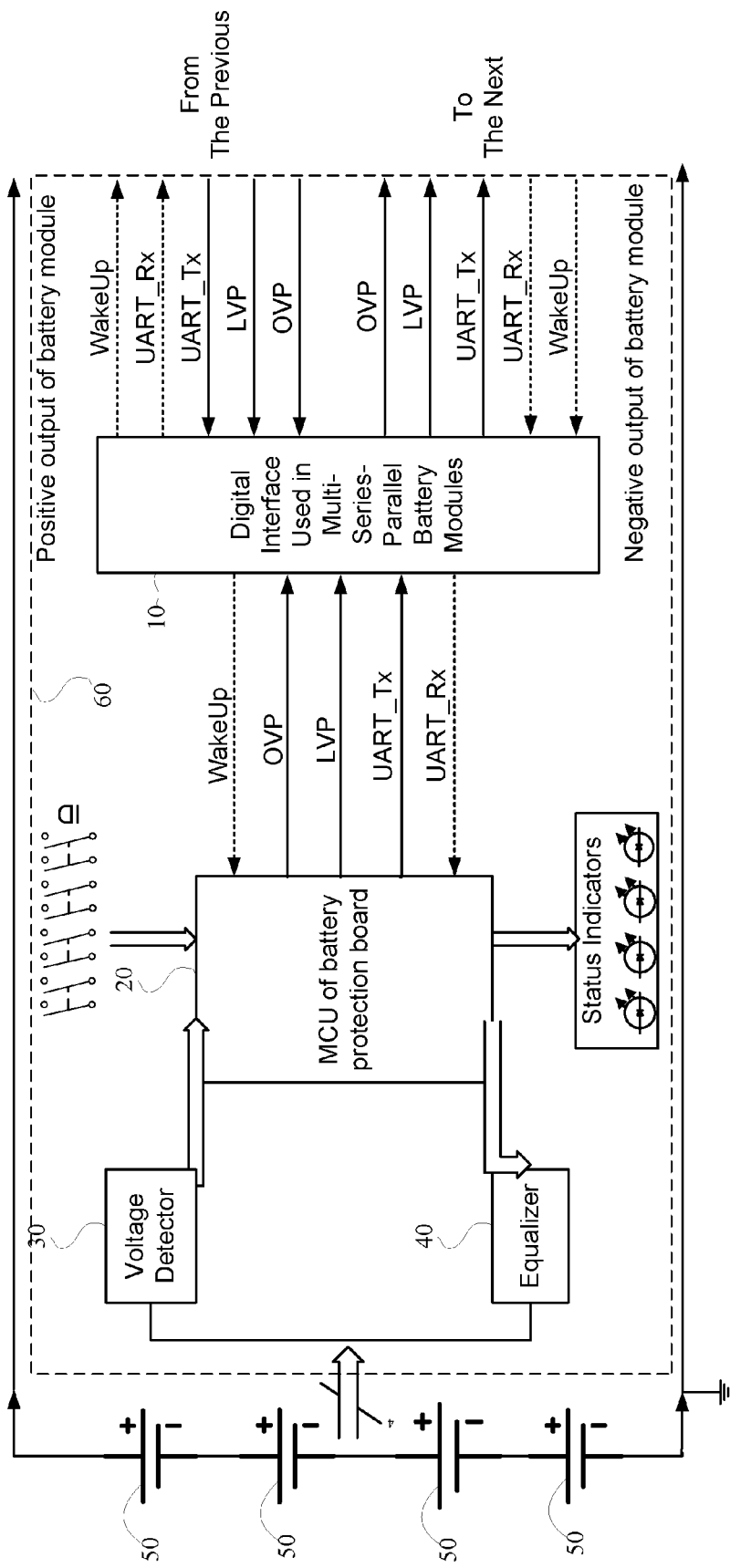
FIG. 5 illustrates the battery system module of the present invention.

Referring FIG. 5 which illustrates the battery system module of the present invention. It can be seen from FIG. 5 that the battery system 1 comprises: (1) batteries 50; (2) a voltage detector 30 (voltage-reading element) which is connected to batteries 50 and used to detect voltage of batteries 50; (3) an equalizer 40 which is connected to batteries 50 and used to fine-tune charging and discharging efficiency of batteries 50; (4) a battery protection board 60 on which there is a Micro Control Unit (MCU) 20 used in receiving signals from the voltage detector 30 for characteristic differences between batteries 50 balanced by the equalizer 40 and batteries 50 with similar charging and discharging efficiency; (5) a digital interface 10 which is taken as a signal transmission interface by linking the MCU 20 and an upper-level control system. Furthermore, the battery system 1 of the present invention with the digital interface (Universal Asynchronous Receiver/Transmitter) 10 and buffer registers built in the MCU 20 allows compiled source codes to monitor batteries' status and delivers an algorithm for a balance mechanism without interference arising from interruption of digital communication.

Figure 6:
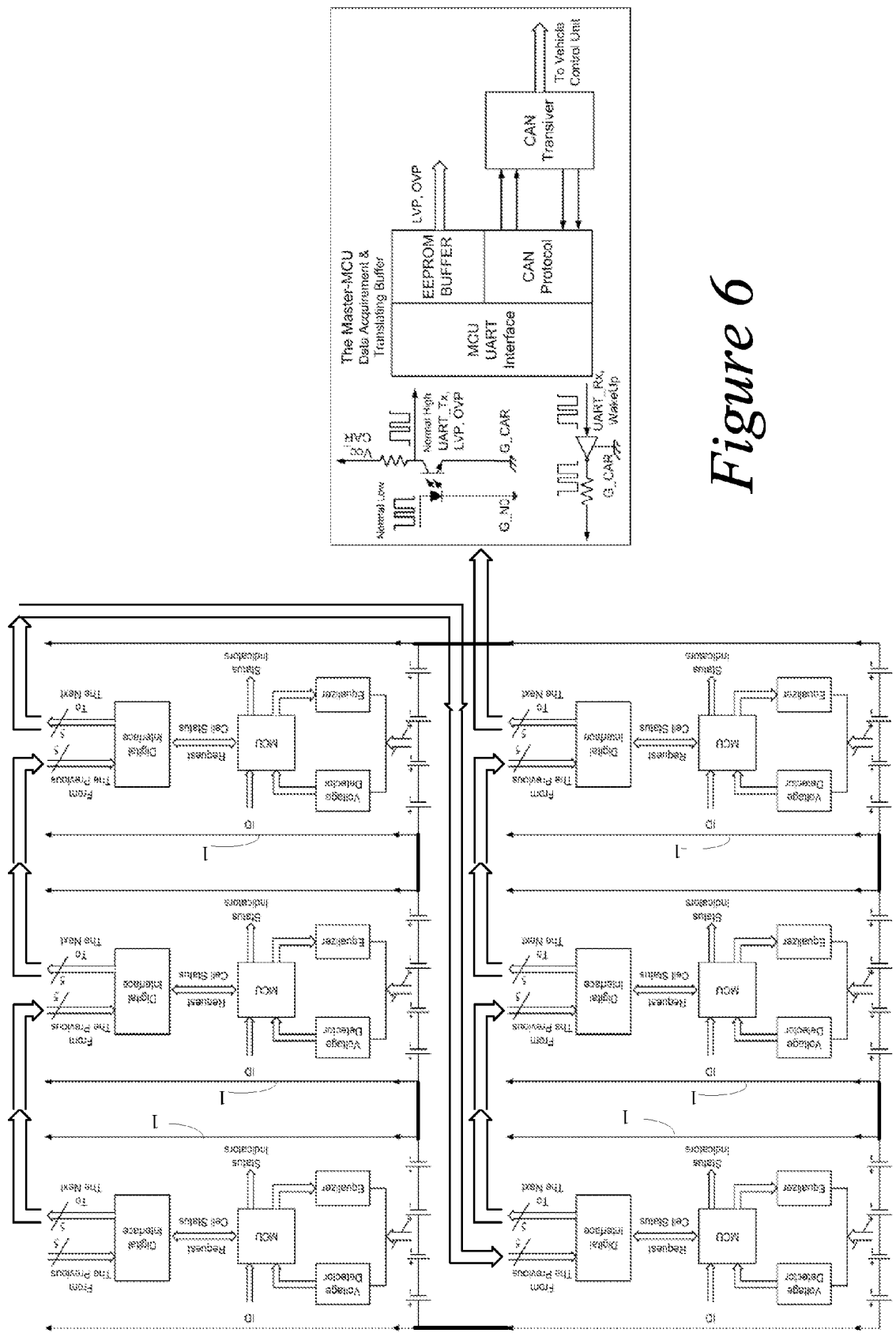
FIG. 6 illustrates the battery system in the present invention which comprises multiple series-parallel battery systems.

Referring to FIG. 6 which illustrates a serial and parallel connection of multiple battery systems in the present invention. It can be seen from FIG. 6 the serial-connected LVP and OVP signals in the battery system 1 of the present invention are intended for control of electricity imported to or exported from batteries wherein the LVP (or OVP) signal sent from each of six units of battery protection boards will be transmitted to a corresponding power switch via a serial-connected digital interface for disconnection of charging or discharging and protection of batteries' voltage. The Universal Asynchronous Receiver/Transmitter is able to receive commands from a diagnosis device (e.g., computer or Personal Digital Assistant (PDA) for diagnoses), feedback digital data (e.g., battery core's voltage or battery unit's capacity) required by a diagnosis device, or depend on a diagnosis device to send over (low) voltage signals via a level shift circuit or a Universal Serial Bus (USB). Based on this design concept, the serial-connected digital interface 1 completes not only a serial connection of all battery protection boards for monitoring communication of systems but also diagnoses of the battery protection board via one corresponding diagnosis program. In some specific situations, the Universal Asynchronous Receiver/Transmitter as one MCU's universal interface can be replaced with an external adapter to transfer digital signals into another interface, for instance, Controller Area Network Bus (CAN-Bus) frequently used by a vehicle computer in which the battery system 1 is referred to as one sub-system of a vehicle-borne system.

It must be stressed that the said disclosures demonstrate a preferred embodiment of the present invention only which is not used to restrict the present invention and any equivalent practice or change without departing from the spirit of the invention as disclosed is still within claims hereinafter.

With the above descriptions summarized, the present invention which features innovation in technical concepts and effects superior to those of prior arts complies with the statutory subject matters for patentability in novelty and unobviousness and is applied for the patent.

What is claimed is:

1. A battery system comprising:
   a plurality of batteries;
   a voltage detector which links the batteries to detect their voltage;
   an equalizer which links the batteries to fine-tune their charging and discharging efficiency;
   a battery protection board on which there is a MCU used to receive signals from the voltage detector for characteristic differences between batteries balanced by the equalizer and batteries with similar charging and discharging efficiency; and
   a digital interface connected between the MCU and an upper-level control system as one interface of signal transmission.

2. The battery system according to claim 1 wherein a serial or parallel connection of the multiple battery systems can be delivered by means of the digital interface.

3. The battery system according to claim 1 wherein the digital interface is a Universal Asynchronous Receiver/Transmitter.

4. The battery system according to claim 1 wherein the digital interface further comprises an Up-Link interface and a Down-Link interface, both of which are used to deliver voltage level protection signals including Low-Voltage Protection (LVP) signal, Over-Voltage Protection (OVP) signal and Wake-Up signal to wake up the MCU.

5. The battery system according to claim 4 wherein either the Up-Link interface or the Down-Link interface is made up of a voltage isolator and a logic gate circuit; the voltage isolator is used to deliver neither any different voltage level during signals transmitted between different battery modules nor transmitted digital signals affected by series-parallel battery modules; and the logic gate circuit is used to complete signal transition and adjust a signal's rising time and falling time.

6. The battery system according to claim 5 wherein the voltage isolator could be a Photo-Coupler, a Photo-MOSFET or a Photo-Replay.

7. The battery system according to claim 5 wherein the logic gate circuit is constructed with standard logic gates which are composed of Bio-Polar Transistors (BJT), Field-Effect Transistors (FET) or Metal-Oxide-Semiconductor Field-Effect Transistors (MOSFET).

8. The battery system according to claim 1 wherein the battery system further comprises an external adapter which is used to transform signals from the digital interface to signals controlling a network interface.

9. The battery system according to claim 1 wherein the upper-level control system further comprises a Master-MCU which receives signals from the digital interface and feed-backs overall status of the battery system to a main control system.

10. The battery system according to claim 9 wherein the main control system is an electric car's control system.

* * * * *